May 20, 1958 — C. G. K. MILLS — 2,835,457
HELICOPTER
Filed Dec. 14, 1956 — 2 Sheets-Sheet 1
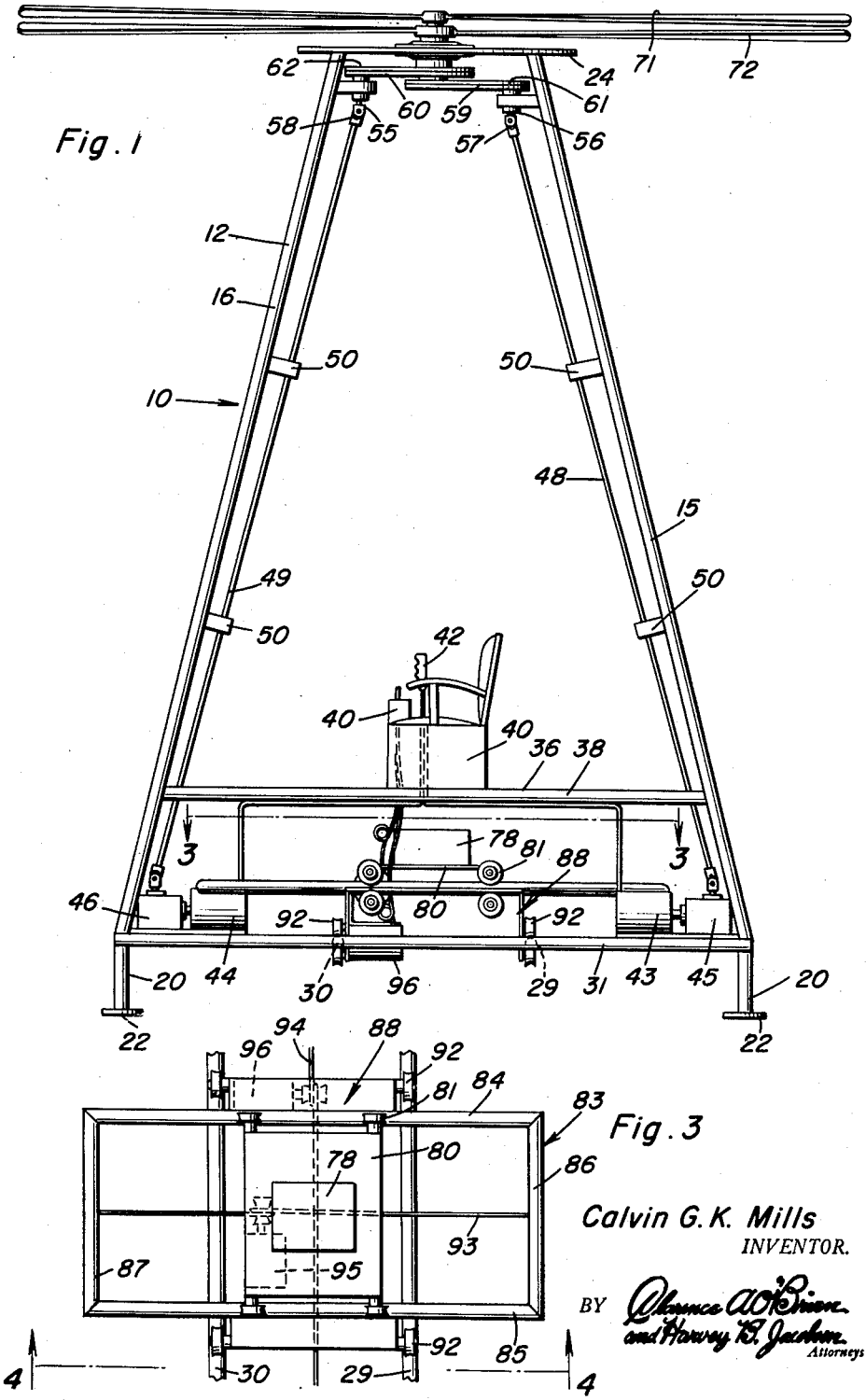
Calvin G. K. Mills
INVENTOR.

May 20, 1958 C. G. K. MILLS 2,835,457
HELICOPTER
Filed Dec. 14, 1956 2 Sheets-Sheet 2
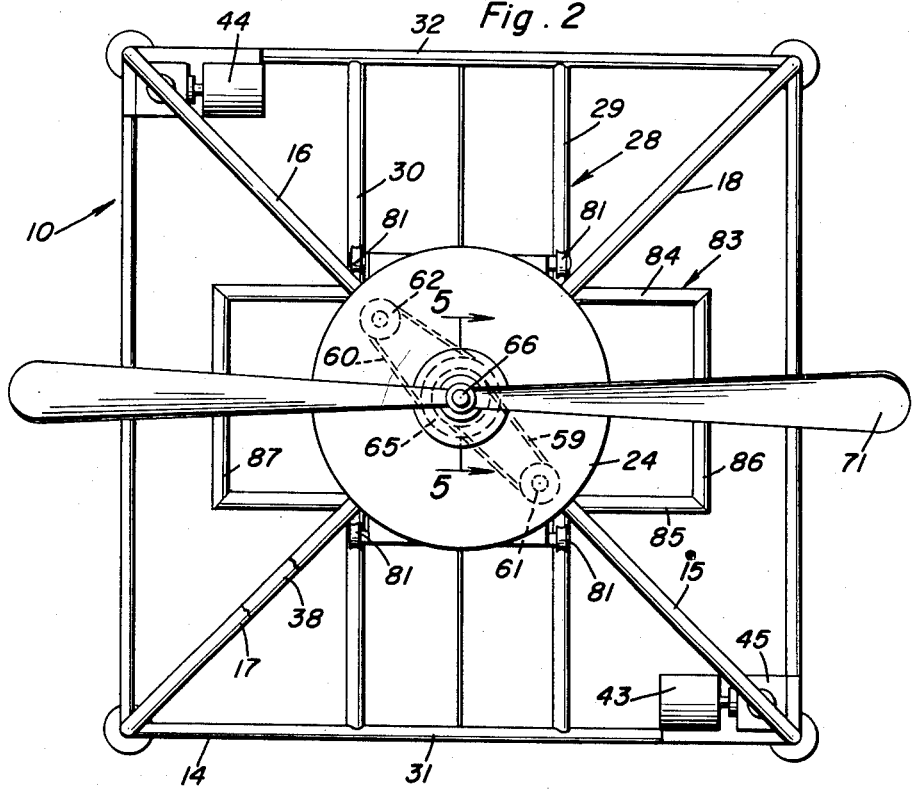
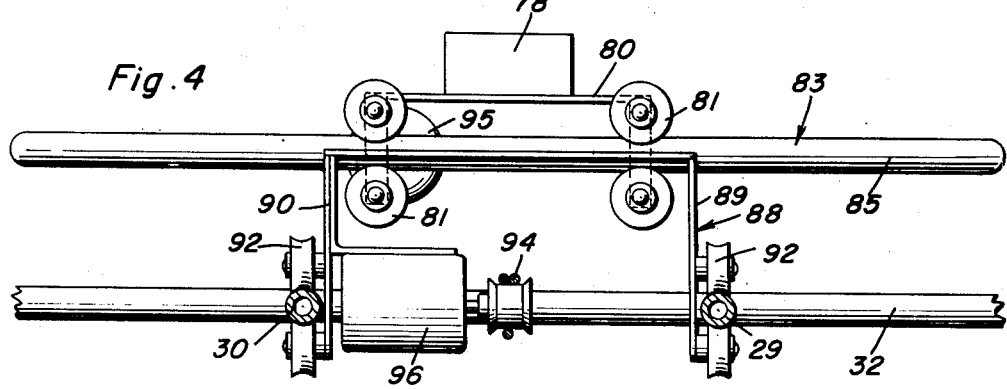
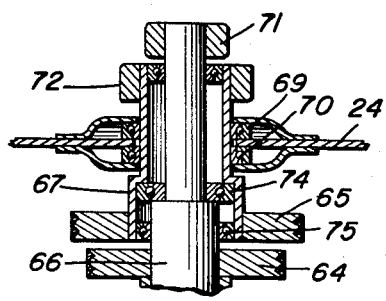
Calvin G. K. Mills
INVENTOR

United States Patent Office 2,835,457
Patented May 20, 1958

2,835,457

HELICOPTER

Calvin G. K. Mills, Canon City, Colo.

Application December 14, 1956, Serial No. 628,318

3 Claims. (Cl. 244—17.19)

This invention relates to helicopters and more particularly relates to a helicopter of the type which is principally useful as a lightweight aircraft.

An object of the present invention is to provide a helicopter of improved construction which has a novel arrangement for lateral control thereof and which is capable of being produced in a lightweight, easily portable and maneuverable manner wherein the expense involved in the original production is minimal.

A further object of the invention is to provide a helicopter which is sensitive as to the control thereof and capable of vertical, hovering or other flight attitudes and directions of the more expensive and heavier helicopters which are in common use at the present time.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is an elevational side view of a helicopter which is constructed in accordance with the invention;

Figure 2 is a top view of the helicopter in Figure 1;

Figure 3 is a sectional view taken on the line 3—3 of Figure 1;

Figure 4 is a view taken on the line 4—4 of Figure 3; and

Figure 5 is an enlarged sectional view taken on the line 5—5 of Figure 2.

In the accompanying drawings there is a helicopter 10 which is constructed in accordance with the principles of the invention. Helicopter 10 has a lightweight, preferably metal tubing, airframe 12. Base frame 14 is connected to the side of the airframe, the sides being formed by four corner posts 15, 16, 17 and 18 respectively whose lower ends are attached at the corners of the substantially square base frame 14. Landing supports in the form of posts 20 with feet 22 are attached at the corners of the base frame 14 and project downwardly. The corner posts 15, 16, 17 and 18 are inclined inwardly as they rise upwardly and are welded or otherwise secured to the upper base 24. Lower track 28 is formed by tubular rails 29 and 30, the rails being secured at their opposite ends to the base frame members 31 and 32 respectively. Platform 36 supported by tubing 38 welded or otherwise attached to the four corner posts, is adapted to accommodate and support the pilot seat 40. The seat is equipped with an engine control box 40 together with a flight control stick 42 which will be described subsequently.

The power plant consists of two engines 43 and 44 respectively which are secured to opposite corners of the base frame 14, and through transmissions 45 and 46 which are drivingly connected to the engines 43 and 44, actuate the drive shafts 48 and 49. The drive shafts are supported in bearings 50 along corner posts 15 and 16 respectively and are drivingly connected to short bearing supported shafts 55 and 56 by means of universal joints 57 and 58. There are means drivingly connecting these small shafts 55 and 56, for example belts 59 and 60 entrained around pulleys 61 and 62 respectively and also around pulleys 64 and 65 (Figure 5) which are attached to concentric shafts 66 and 67 respectively. Both of the shafts 55 and 56 are supported by the upper base 24 in bearings 69 and 70 with the outer shaft 67 being hollow and the inner shaft passed therethrough in order to accommodate the upper propeller 71. Lower propeller 72 is attached to the outer shaft 67 and the propellers are counter rotating. Anti-friction bearing 74 and a similar bearing 75 mount the two shafts with respect to each other for free rotation while the pulley and belt arrangement drive the propellers 71 and 72 in opposite directions. The controls 40 are schematically represented, as are the motors 43 and 44.

Lateral control for the helicopter is obtained by moving a weight 78 fore or aft or to the port or starboard side of the airplane. Weight 78 is carried on carriage 80, the latter having upper and lower pairs 81 of wheels at the four corners thereof. The upper wheels are mounted on the upper track 83, the latter having rails 84 and 85 held parallel to each other by cross members 86 and 87 at the ends thereof. Upper track 83 has its rails perpendicular to and elevated slightly above the rails of the lower track 28. The upper track 83 is movable with respect to the rails of the lower track by being on support 88, the latter having end members 89 and 90 which are welded or otherwise fixed to the sides of the rails 84 and 85 and which depend to support four pairs of upper and lower wheels 92 at the corners thereof. The pairs of upper and lower wheels 92 are on the top and bottom sides respectively of the rails 29 and 30 that have been previously described. This provides for motion of the weight 78 in the $x$ and $y$ directions.

Cables 93 and 94 respectively are used to operate the carriage, the cables being attached to motors 95 and 96 respectively by being wrapped once or twice around a pulley which is driven by each of the motors. The ends of the cables 93 and 94 are fixed, the ends of cable 94 being fixed to the airplace while the ends of cable 93 are fixed to the end cross members 86 and 87 of the upper track 83. Standard type of motor controls are used to energize selected motors 96 and 95 either individually or simultaneously in order to shift the weight 87 for lateral control. For hovering flight the weight should be located directly under the pilot seat and directly under the axis of rotation of the propellers. This is in the absence of any trim which would be applied by shifting the weight 78 slightly in the proper direction. Forward and other lateral flight directions are obtained by shifting weight 78.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A helicopter comprising an airframe, said airframe having a base frame and an upper frame, posts which converge inwardly and rise upwardly from said base frame to said upper frame, counter rotating propellers at the top of said upper frame, means carried by said base frame but drivingly connecting said counter rotating propellers for rotation in opposite directions, a weight carried by said base frame, means for shifting said weight in four directions in order to achieve lateral control of the airframe and comprising an upper track, a carriage mounted on said upper track, means including upper and lower pairs of wheels preventing said carriage from separating from said upper track, a lower track having rails at right angles to said upper tracks, and means mounting said upper track and said carriage on said lower track.

2. The combination of claim 1 wherein there are motors and cables drivingly connected to said carriage and to the means connecting said upper frame to said lower frame.

3. In a helicopter, an airframe having corner posts which are inclined inwardly and upwardly, an upper base secured to said corner posts, a lower base frame secured at the lower ends of said corner posts, a platform, a pilot seat on said platform, a weight located below said pilot seat, an upper and lower track carried by said frame, said upper track having rails at right angles to the rails of said lower track, a carriage mounted on said upper track and supporting said weights, and means for moving said carriage longitudinally on said upper track and for moving said carriage and said upper track bodily on said lower track in order to obtain lateral control in all directions in order to change the attitude of the airframe.

References Cited in the file of this patent

UNITED STATES PATENTS

| | | |
|---|---|---|
| 1,379,522 | Bruner | May 24, 1921 |
| 2,535,164 | Seibel | Dec. 26, 1950 |

FOREIGN PATENTS

| | | |
|---|---|---|
| 198,878 | Switzerland | July 15, 1938 |
| 393,997 | France | Jan. 11, 1909 |